United States Patent
Ravinoothala et al.

(10) Patent No.: US 10,038,628 B2
(45) Date of Patent: Jul. 31, 2018

(54) ROUTE SERVER MODE FOR DYNAMIC ROUTING BETWEEN LOGICAL AND PHYSICAL NETWORKS

(71) Applicant: Nicira, Inc., Palo Alto, CA (US)

(72) Inventors: Sreeram Ravinoothala, San Jose, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 25 days.

(21) Appl. No.: 15/007,165

(22) Filed: Jan. 26, 2016

(65) Prior Publication Data

US 2016/0294612 A1 Oct. 6, 2016

Related U.S. Application Data

(60) Provisional application No. 62/143,086, filed on Apr. 4, 2015.

(51) Int. Cl.
| | |
|---|---|
| *H04L 12/28* | (2006.01) |
| *H04L 12/717* | (2013.01) |
| *H04L 12/715* | (2013.01) |
| *H04L 12/931* | (2013.01) |
| *H04L 12/703* | (2013.01) |

(52) U.S. Cl.
CPC ............. *H04L 45/42* (2013.01); *H04L 45/64* (2013.01); *H04L 45/28* (2013.01); *H04L 49/354* (2013.01); *H04L 49/70* (2013.01)

(58) Field of Classification Search
None
See application file for complete search history.

(56) References Cited

U.S. PATENT DOCUMENTS

| | | | |
|---|---|---|---|
| 5,504,921 A | 4/1996 | Dev et al. | |
| 5,550,816 A | 8/1996 | Hardwick et al. | |
| 5,751,967 A | 5/1998 | Raab et al. | |
| 6,006,275 A | 12/1999 | Picazo, Jr. et al. | |
| 6,104,699 A | 8/2000 | Holender et al. | |

(Continued)

FOREIGN PATENT DOCUMENTS

| | | |
|---|---|---|
| CN | 106134137 A | 11/2016 |
| CN | 107534578 A | 1/2018 |

(Continued)

OTHER PUBLICATIONS

PCT/US2016/025689, Apr. 1, 2016 (filing date), Nicira, Inc.

(Continued)

*Primary Examiner* — Minh-Trang Nguyen
(74) *Attorney, Agent, or Firm* — Adeli LLP

(57) ABSTRACT

Some embodiments provide a method for configuring a logical router that interfaces with an external network. The method receives a configuration for a logical network that includes a logical router with several interfaces that connect to at least one physical router external to the logical network. The method selects a separate host machine to host a centralized routing component for each of the interfaces. The method selects a particular one of the host machines for operating a dynamic routing protocol control plane that receives routing protocol data from each of the centralized routing components and updates routing tables of each of the centralized routing components.

20 Claims, 12 Drawing Sheets

(56) References Cited

U.S. PATENT DOCUMENTS

| | | |
|---|---|---|
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,754,220 B1* | 6/2004 | Lamberton ......... H04L 12/2856 340/2.1 |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,428,220 B1 | 9/2008 | Caronni et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,519,734 B1 | 4/2009 | Dumitriu et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,647,426 B2 | 1/2010 | Patel et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,014,278 B1 | 9/2011 | Subramanian et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,762,507 B1 | 6/2014 | Ingram et al. |
| 8,958,298 B2 | 2/2015 | Zhang et al. |
| 8,997,094 B2 | 3/2015 | Bosch et al. |
| 9,059,999 B2 | 6/2015 | Koponen et al. |
| 9,203,703 B2 | 12/2015 | Koponen et al. |
| 9,225,597 B2 | 12/2015 | Tubaltsev et al. |
| 9,503,371 B2 | 11/2016 | Thakkar et al. |
| 9,577,845 B2 | 2/2017 | Thakkar et al. |
| 9,590,901 B2 | 3/2017 | Tubaltsev et al. |
| 2001/0043614 A1 | 11/2001 | Viswanadham et al. |
| 2002/0093952 A1 | 7/2002 | Gonda |
| 2002/0095498 A1 | 7/2002 | Chanda et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056317 A1 | 3/2006 | Manning et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0198321 A1 | 9/2006 | Nadeau et al. |
| 2006/0291388 A1 | 12/2006 | Amdahl et al. |
| 2007/0028244 A1 | 2/2007 | Landis et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0140235 A1 | 6/2007 | Aysan et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0031263 A1 | 2/2008 | Ervin et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | De Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |

(56) References Cited

U.S. PATENT DOCUMENTS

| | | |
|---|---|---|
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1 | 10/2009 | Yan et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0149992 A1 | 6/2010 | Tan et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0121209 A1 | 5/2013 | Padmanabhan et al. |
| 2013/0125120 A1 | 5/2013 | Zhang et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0250951 A1 | 9/2013 | Koganti |
| 2013/0254599 A1 | 9/2013 | Katkar et al. |
| 2013/0266015 A1 | 10/2013 | Qu et al. |
| 2013/0266019 A1* | 10/2013 | Qu .................. H04L 45/74 370/395.53 |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0050218 A1 | 2/2014 | Kamble et al. |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0372582 A1 | 12/2014 | Ghanwani et al. |
| 2015/0009831 A1 | 1/2015 | Graf |
| 2015/0010009 A1 | 1/2015 | Takahashi et al. |
| 2015/0063360 A1 | 3/2015 | Thakkar et al. |
| 2015/0263899 A1 | 9/2015 | Tubaltsev et al. |
| 2015/0263946 A1 | 9/2015 | Tubaltsev et al. |
| 2015/0271011 A1 | 9/2015 | Neginhal et al. |
| 2015/0309901 A1 | 10/2015 | Pershin et al. |
| 2016/0080483 A1 | 3/2016 | Li et al. |
| 2016/0205196 A1 | 7/2016 | Hasan et al. |
| 2017/0005915 A1 | 1/2017 | Mirsky et al. |
| 2017/0139789 A1 | 5/2017 | Fries et al. |
| 2017/0142012 A1 | 5/2017 | Thakkar et al. |
| 2017/0163532 A1 | 6/2017 | Tubaltsev et al. |
| 2017/0317954 A1 | 11/2017 | Masurekar et al. |
| 2017/0317971 A1 | 11/2017 | Dubey et al. |
| 2018/0006880 A1 | 1/2018 | Shakimov et al. |

FOREIGN PATENT DOCUMENTS

| | | |
|---|---|---|
| EP | 1653688 A1 | 5/2006 |
| EP | 2849395 A1 | 3/2015 |
| EP | 3117561 A2 | 1/2017 |
| GB | 2419703 | 5/2006 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | WO 2013/113265 | 8/2013 |
| WO | 2015138043 A2 | 9/2015 |
| WO | WO 2015/142404 | 9/2015 |
| WO | 2016164277 A1 | 10/2016 |

OTHER PUBLICATIONS

International Search Report and Written Opinion of PCT/US2016/025689, dated Jul. 7, 2016, Nicira, Inc.

Lin, Pingping, et al., "Seamless Interworking of SDN and IP," SIGCOMM '13, Aug. 27, 2013, pp. 475-476, ACM, 2 Penn Plaza, Suite 701, New York, NY.

Mechtri, Marouen, et al., "Inter and Intra Cloud Networking Gateway as a Service," 2013 IEEE 2nd International Conference on Cloud Networking (CloudNet), Nov. 11, 2013, pp. 156-163, IEEE.

Aggarwal, R., et al., "Data Center Mobility based on E-VPN, BGP/MPLS IP VPN, IP Routing and NHRP; draft-raggarwa-data-center-mobility-05.txt," Jun. 10, 2013, 24 pages, Internet Engineering Task Force (IETF).

Caesar, Matthew, et al., "Design and Implementation of a Routing Control Platform," NSDI '05: 2nd Symposium on Networked Systems Design & Implementation, Apr. 2005, 15 pages, USENIX Association.

Dumitriu, Dan Mihai, et al. (U.S. Appl. No. 61/514,990), filed Aug. 4, 2011.

Handley, Mark, et al., "Designing Extensible IP Router Software," Proc. Of NSDI, May 2005, 14 pages.

Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

Lakshminarayanan, Karthik, et al., "Routing as a Service," Month Unknown, 2004, 16 pages, Berkeley, California.

(56) References Cited

OTHER PUBLICATIONS

Maltz, David A., et al., "Routing Design in Operational Networks: A Look from the Inside," SIGCOMM'04, Aug. 30-Sep. 3, 2004, 14 pages, ACM, Portland, Oregon, USA.

Wang, Anjing, et al., "Network Virtualization: Technologies, Perspectives, and Frontiers," Journal of Lightwave Technology, Feb. 15, 2013, 15 pages, IEEE.

Rosen, E., et al., "Applicability Statement for BGP/MPLS IP Virtual Private Networks (VPNs)," The Internet Society, RFC 4365, Feb. 2006, 33 pages.

Shenker, Scott, et al., "The Future of Networking, and the Past of Protocols," Dec. 2, 2011, 30 pages, USA.

Non-Published Commonly Owned U.S. Appl. No. 15/451,372, filed Mar. 6, 2017, 32 pages, Nicira, Inc.

Non-Published Commonly Owned U.S. Appl. No. 15/387,549, filed Dec. 21, 2016, 56 pages, Nicira, Inc.

\* cited by examiner

ROUTE SERVER MODE FOR DYNAMIC ROUTING BETWEEN LOGICAL AND PHYSICAL NETWORKS

BACKGROUND

Typical physical networks contain several physical routers to perform L3 forwarding (i.e., routing). When a first machine wants to send a packet to a second machine located on a different IP subnet, the packet is sent to a router that uses a destination IP address of the packet to determine through which of its physical interfaces the packet should be sent. Larger networks will contain multiple routers, such that if one of the routers fails, the packets can be routed along a different path between the first machine and the second machine. Both within a contained network and across network boundaries, routing protocols are used to advertise routes through the network. That is, a first router peers with a second router and sends messages to the second router indicating which addresses it can reach through its other interfaces and how far away those addresses are. The first router also receives corresponding information from the second router, and uses this information to determine how to route packets.

In logical networks implemented in a datacenter, user-defined data compute nodes (e.g., virtual machines) on different subnets may need to communicate with each other, as well as with machines external to the datacenter. In this case, tenants may define a network for virtualization that includes both logical switches and logical routers. Methods for implementing the logical routers to adequately serve such virtualized logical networks in datacenters are needed, including methods that allow for a similar route exchange with routers of the external physical network.

BRIEF SUMMARY

Some embodiments provide a method for implementing a dynamic routing protocol for a logical router that interfaces with an external network (e.g., external to the datacenter in which the logical router is implemented. In some embodiments, the logical router has multiple interfaces with the external network, each of which is implemented in a separate gateway host machine. When selecting the gateway host machines to implement these interfaces, a network controller of some embodiments selects one of the gateway host machines to also implement a dynamic routing protocol control plane. Each of the interfaces operates as a separate component, advertising routes to the external network and receiving dynamic routing protocol information (e.g., BGP or OSPF packets, or data for any other dynamic routing protocol). The various interfaces at the gateway host machines forward the dynamic routing protocol packets to the single control plane, which performs route calculation to update routing tables for the gateway host machines to use in implementing the logical router interfaces.

In some embodiments, the logical router is implemented in a managed network (e.g., a datacenter) in both distributed and centralized fashion. Specifically, the management plane of some embodiments (implemented, e.g., in a network controller) receives a logical router configuration (e.g., through an API) and defines multiple routing components for the logical router. In some embodiments, when the logical router connects to an external network the management plane defines one distributed routing component for the logical router, and one centralized routing component for each interface of the logical router that connects to the external network. Each of these centralized routing components is then assigned to a gateway host machine that implements the corresponding interface. In some embodiments, the management plane generates a routing table for each of the centralized routing components and configures them with these routing tables.

In addition, the user (e.g., network administrator) that configures the logical router may specify for the router to advertise one or more public IP subnets to the external network, in order to attract traffic directed to that subnet. As mentioned, some embodiments select one of the gateway host machines that implements a centralized routing component to implement a dynamic routing protocol control plane (e.g., in a same virtual machine or other data compute node that implements the centralized routing component, in a different virtual machine or other data compute node, etc.).

All of the centralized routing components advertise the specified public IP subnets, and receive dynamic routing protocol packets advertising routes from the external routers to which they connect. Rather than processing these packets locally (which would often result in duplicative processing), the centralized components are configured to pass these packets to the selected gateway host machine, which removes duplicative information and updates the respective routing tables.

In some embodiments, all of the gateway host machines that implement centralized components for a logical router are configured with the ability to run the dynamic routing protocol control plane. The protocol stack running on the selected gateway host machine operates as the master, and only if that machine fails does one of the others take over. In this case, the standby control plane takes over in a manner similar to graceful restart for a standard router. That is, the newly-determined master would indicate to the physical external router (through packets sent from the several centralized routing components) to send all of its routes, which would enable the control plane to recalculate the updated routing tables for the centralized components.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
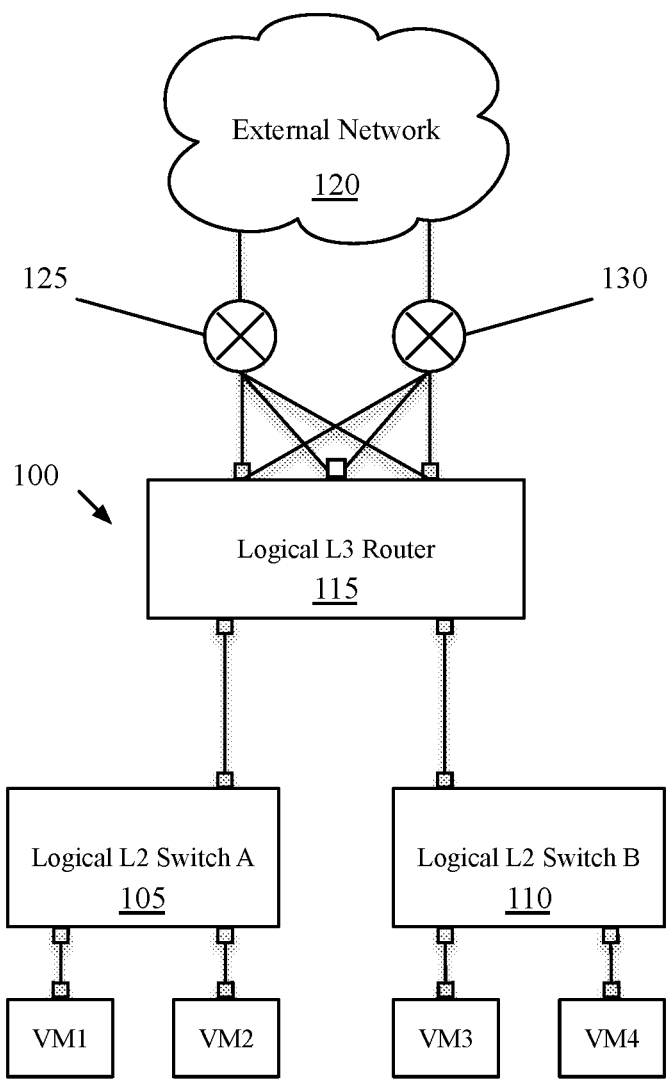
FIG. 1 illustrates a configuration view of a logical network that includes a logical router, which represents the logical network as designed by a user.

Some embodiments provide a method for implementing a dynamic routing protocol for a logical router that interfaces with an external network (e.g., external to the datacenter in which the logical router is implemented. In some embodiments, the logical router has multiple interfaces with the external network, each of which is implemented in a separate gateway host machine. When selecting the gateway host machines to implement these interfaces, a network controller of some embodiments selects one of the gateway host machines to also implement a dynamic routing protocol control plane. Each of the interfaces operates as a separate component, advertising routes to the external network and receiving dynamic routing protocol information (e.g., Border Gateway Protocol (BGP) or Open Shortest Path First (OSPF) packets). The various interfaces at the gateway host machines forward the dynamic routing protocol packets to the single control plane, which performs route calculation to update routing tables for the gateway host machines to use in implementing the logical router interfaces.

In some embodiments, the logical router is implemented in a managed network (e.g., a datacenter) in both distributed and centralized fashion. Specifically, the management plane of some embodiments (implemented, e.g., in a network controller) receives a logical router configuration (e.g., through an application programming interface (API)) and defines multiple routing components for the logical router. In some embodiments, when the logical router connects to an external network the management plane defines one distributed routing component for the logical router (referred to as a distributed router, or DR), and one centralized routing component for each interface of the logical router that connects to the external network (referred to as service routers, or SRs). Each of these SRs is then assigned to a gateway host machine that implements the corresponding interface. In some embodiments, the management plane generates a routing table for each of the SRs and configures them with these routing tables. The management plane operations to define multiple routing components for a logical router are described in further detail in U.S. Provisional Application 62/110,061, filed Jan. 30, 2015, and U.S. patent application Ser. No. 14/814,473, filed Jul. 30, 2015 and now issued as U.S. Pat. No. 9,787,605, which are incorporated herein by reference.

In addition, the user (e.g., network administrator) that configures the logical router may specify for the router to advertise one or more public IP subnets to the external network, in order to attract traffic directed to that subnet. As mentioned, some embodiments select one of the gateway host machines that implements a SR to implement a dynamic routing protocol control plane (e.g., in a same virtual machine or other data compute node that implements the SR, in a different virtual machine or other data compute node, etc.).

All of the SRs advertise the specified public IP subnets and receive dynamic routing protocol packets advertising routes from the external routers to which they connect. Rather than processing these packets locally (which would often result in duplicative processing), the SRs are configured to pass these packets to the selected gateway host machine, which removes duplicative information and updates the respective routing tables.

In some embodiments, all of the gateway host machines that implement SRs for a logical router are configured with the ability to run the dynamic routing protocol control plane. The protocol stack running on the selected gateway host machine operates as the master, and only if that machine fails does one of the others take over. In this case, the standby control plane takes over in a manner similar to graceful restart for a standard router. That is, the newly-determined master would indicate to the physical external router (through packets sent from the several SRs) to send all of its routes, which would enable the control plane to recalculate the updated routing tables for the SRs.

The above introduces the concept of having one of several gateways between a logical network and an external physical network acting as a route server for the logical router that interfaces with the external physical network. In the following, Section I introduces the logical routers of some embodiments and their physical implementation. Next, Section II describes the operation of a centralized routing component in route server mode according to some embodiments. Finally, Section III describes the electronic system with which some embodiments of the invention are implemented.

I. Logical Router and Physical Implementation

The following discussion describes the design of logical routers for some embodiments as well as the implementation of such logical routers by the network controllers of some embodiments. Logical routers, in some embodiments, exist in three different forms. The first of these forms is the API view, or configuration view, which is how the logical router is defined by a user (e.g., a datacenter provider or tenant). The second view is the control plane, or management plane, view, which is how the network controller internally defines the logical router. Finally, the third view is the physical realization, or implementation of the logical router, which is how the logical router is actually implemented in the datacenter. That is, the logical router is an abstraction describing a set of functionalities (e.g., routing, NAT, etc.) that a user configures for the logical router. The logical router is then implemented by various machines in the datacenter based on instructions distributed to those machines by a set of network controllers, with the instructions generated by the network controllers according to the configuration provided by the user.

In the control plane view, the logical router of some embodiments may include one or both of a single DR and one or more SRs. The DR, in some embodiments, spans managed forwarding elements (MFEs) that couple directly to VMs or other data compute nodes that are logically connected, directly or indirectly, to the logical router. The DR of some embodiments also spans the gateways to which the logical router is bound. The DR, in some embodiments, is responsible for first-hop distributed routing between logical switches and/or other logical routers that are logically connected to the logical router. The SRs of some embodiments are responsible for delivering services that are not implemented in a distributed fashion (e.g., some stateful services).

In some embodiments, the physical realization of a logical router always has a DR (i.e., for first-hop routing). A logical router will have SRs if either (i) the logical router connects to external physical networks or (ii) the logical router has services configured that do not have a distributed implementation (e.g., NAT, load balancing, DHCP in some embodiments), or both. The present subject matter relates to logical routers that connect to external physical networks, and which do so in a uniform manner (i.e., all of the interfaces of the logical router with the external physical network have the same L3 connectivity).

Figure 2:
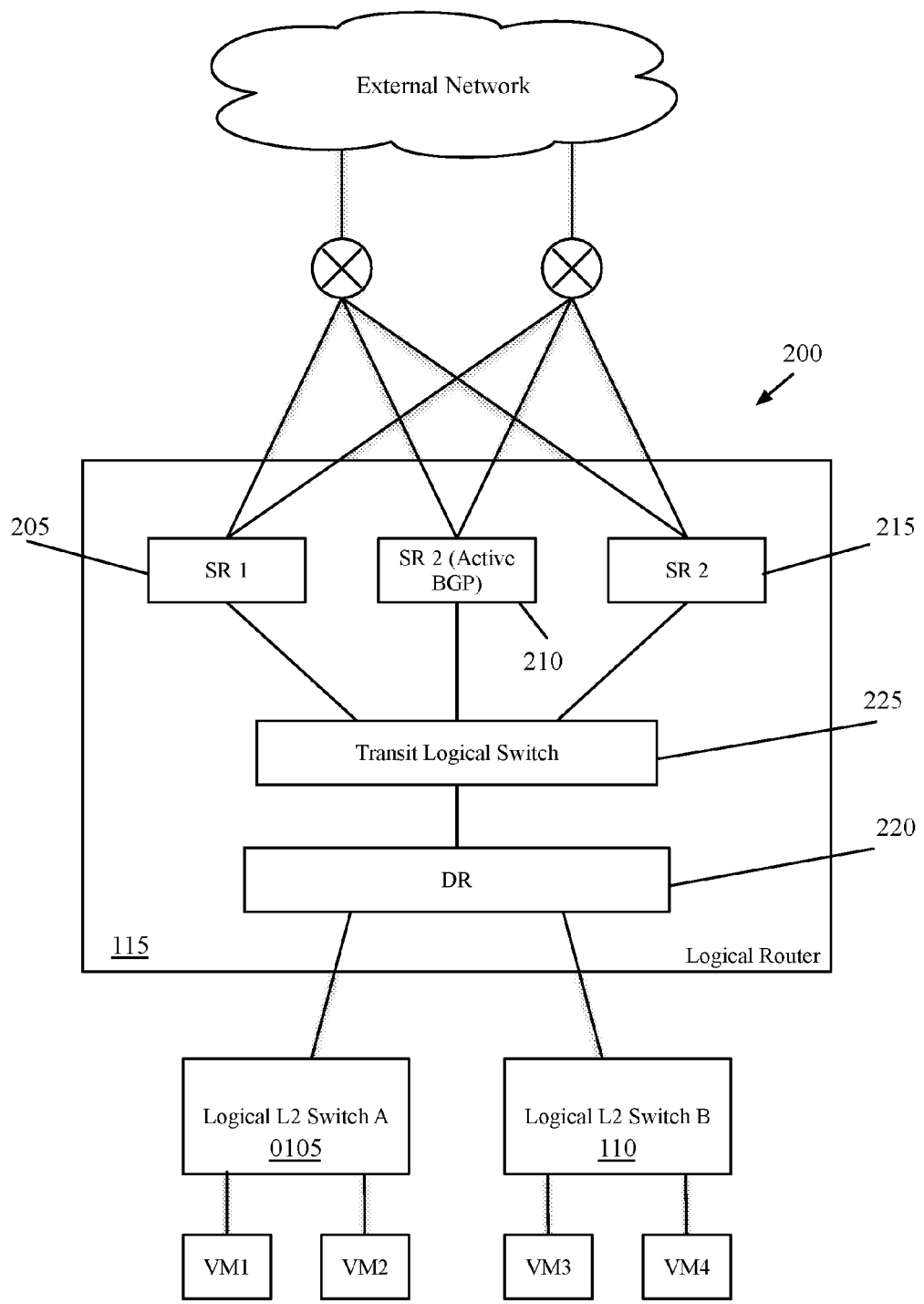
FIG. 2 illustrates a management plane view of the logical network of FIG. 1.
Figure 3:
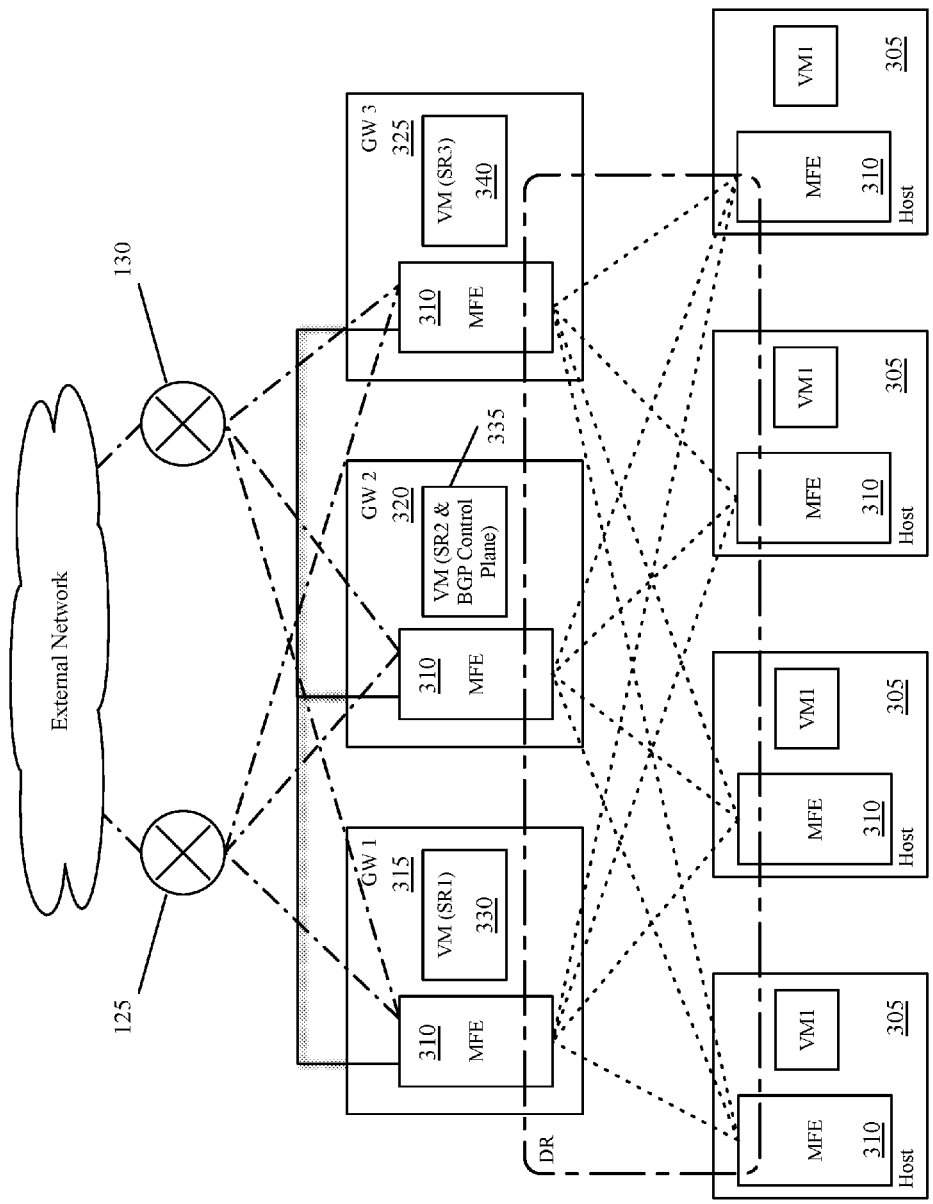
FIG. 3 illustrates a physical implementation of the logical router of FIG. 1.

FIGS. 1-3 illustrate the three different views of an implementation for a logical router 115 that connects to an external network 120. FIG. 1 specifically illustrates the configuration view, which represents a logical network 100 as designed by a user. As shown, the logical router 115 is part of a logical network 100 that includes the logical router 115 and two logical switches 105 and 110. The two logical switches 105 and 110 each have VMs that connect to logical ports. While shown as VMs in these figures, it should be understood that other types of data compute nodes (e.g., namespaces, etc.) may connect to logical switches in some embodiments. In some embodiments, in fact, the user may simply configure these VMs as workloads, allowing the system to determine how to implement the workloads (e.g., as VMs, namespaces, physical machines, etc.).

The logical router 115 also includes three ports (referred to as uplinks) that connect to the external physical network 120. Specifically, each of these three uplinks connects to the same pair of routers 125 and 130. As mentioned, some embodiments require the same L3 connectivity for all of the uplinks of a logical router. Other embodiments, however, allow different uplinks to connect to different sets of external routers, possibly on different subnets (and thus the uplinks are on different subnets from each other). In various different embodiments, the three uplinks of the logical router 115 may be on the same VLAN, or different VLANs.

FIG. 2 illustrates the management plane view 200 of the logical network 100. The logical switches 105 and 110 are the same in this view as the configuration view, but the network controller has created three service routers 205-215 for the logical router 115, as well as a distributed router 220 and a transit logical switch 225. The DR 220 includes a southbound interface for each of the logical switches 105 and 110, and a single northbound interface to the transit logical switch 225 (and through this to the SRs). The SRs 205-215 each include a single southbound interface to the transit logical switch 220 (used to communicate with the DR 220, as well as each other in certain situations). Each SR 205-215 also corresponds to an uplink port of the logical router (that connects to the external network), and thus each of the SRs has a single such interface. Each of these northbound interfaces connects to both of the physical routers 125 and 130, as in the configuration view of the logical network 100.

The detailed configuration of the northbound and southbound interfaces of the various router constructs 205-220 and their connections with the transit logical switch 225 are described in detail in the U.S. Provisional Application 62/110,061 and U.S. patent application Ser. No. 14/814,473, incorporated by reference above, as well as in U.S. patent application Ser. No. 14/871,968, filed Sep. 30, 2015 and now published as U.S. Patent Publication 2017/0048129, which is incorporated herein by reference. In some embodiments, the management plane generates separate routing information bases (RIBs) for each of the router constructs 205-220. That is, in addition to having separate objects created in the management/control plane, each of the router constructs 205-220 is treated as a separate router with a separate routing table. Some embodiments define a subnet for the transit logical switch from a pool of available subnets for internal use, and define the internal interfaces of the router constructs 205-220 as having IP addresses in that subnet. In addition, the management plane assigns MAC addresses to each of the internal interfaces. The RIB (and thus the FIB, after RIB to FIB conversion) for the DR 220 of some embodiments is defined with a default route pointing to any of the three southbound interfaces of the SRs 205-215 (which the implementation would choose among using equal-cost multi-path (ECMP) principles). In addition, the user would typically configure a static default route for the logical router pointing to the external routers 125 and 130, which would be automatically added to the RIBs (and thus the FIBs, after RIB to FIB conversion) for each of the three SRs 205-215.

FIG. 3 illustrates a physical implementation of the logical router 100. As shown, each of the VMs that couples to one of the logical switches 105 and 110 in the logical network 100 resides on a host machine 305. These VMs, though shown in this case on separate host machines, may reside on fewer than four host machines in some cases (i.e., with two or more VMs on the same host machine).

Managed forwarding elements (MFEs) 310 also operate on these host machines 305, in order to implement the distributed aspects of the logical network 100. These MFEs 310, in some embodiments, are software virtual switches (e.g., Open vSwitch (OVS), ESX) that operate within the hypervisors or other virtualization software on the host machines. Though the MFEs are software virtual switches, they may be referred to as physical forwarding elements in order to differentiate them from the logical forwarding elements 105-115, which are abstract elements defined as a network configuration, and which are implemented on the physical forwarding elements. These MFEs 310 perform first-hop switching and routing to implement the logical switches 105 and 110, and the logical router 115, for packets sent by the VMs of the logical network 100. The MFEs 310 (or a subset of them) also may implement logical switches (and distributed logical routers) for other logical networks if the other logical networks have VMs that reside on the host machines 305 as well.

The three SRs 205-215 each operate on different gateway machines 315-320. The gateway machines 315-325 are host machines similar to the machines 305 in some embodiments (e.g., x86 boxes), but host SRs rather than user VMs. In some embodiments, MFEs 310 also operate on the gateway machines 315-325, to handle logical switching as well as routing for the DR 215. For instance, packets sent from the external network 120 may be routed by the SR routing table on one of the gateway machines and then subsequently switched and routed (according to the DR routing table) by the MFE on the same gateway. In addition, the MFE provides the connections to the physical NICs on the gateway machines 315-325. Each of the MFEs 310 in the gateway machines 315-325 connects to both of the external routers 125 and 130 as well as to the other MFEs that implement the logical network in the datacenter (e.g., through tunnels). For differentiation purposes in this figure, tunnels between the edge MFEs (that connect directly to the user VMs) and gateway MFEs (to which the SR VMs 330-340 directly connect) are shown as straight dotted lines, while tunnels between the gateway MFEs are shown as orthogonal solid lines. In addition, the connections from the gateway MFEs to the external routers 125 and 130 are shown as straight dashed/dotted lines.

The SRs may be implemented in a namespace, a virtual machine, or as a VRF in different embodiments. In this example, the SRs 205-215 are implemented as virtual machines 330-340. While some embodiments allow two SRs operating in active-standby mode (e.g., when the SRs provide stateful services such as firewalls), the examples described herein operate in active-active mode (enabling ECMP routing for both ingress and egress traffic).

As shown, one of the SR VMS (specifically, VM 335 that hosts the SR 220) also hosts a BGP control plane. This BGP control plane is a BGP protocol stack that (i) receives routing protocol data from each of the other SRs (when the SRs receive this data from the external routers 125 and 130) and (ii) updates the routing tables of all of the SRs using the routing protocol data. In some embodiments, each of the SRs 205-215 open BGP (or other routing protocol) sessions with each of the external routers 125 and 130. The SRs originate their own BGP packets advertising routes (e.g., for the subnets defined for the logical switches 105 and 110, if public), enabling the routers 125 and 130 to use ECMP routing for packets directed to these subnets.

In addition, as part of the BGP session, the external routers 125 and 130 send BGP packets to each of the SRs 205-215, advertising routes for the networks behind them. For example, the northbound ports of the two routers 125 and 130 might be on different subnets, and would therefore advertise different administrative distances to the different subnets. The SR VMs 330 and 340 receive these packets and pass them on to the VM 335, where the BGP control plane operates. The VM 335 also receives these packets from the routers 125 and 130, and processes them internally. The BGP protocol stack operating in the VM 335 uses all of these BGP packets to identify new routes for the SRs 205-215, and updates its local routing table for SR 210 in addition to sending the routing table updates to the other VMs 330 and 340.

In some embodiments, local network controllers (not shown) operate on each of the gateway host machines, for the purpose of receiving configuration data from a centralized network controller (e.g., as a set of formatted data tuples) and converting those data tuples into configuration data useable by the MFE and SR VM. In some embodiments, the local network controller on a particular one of the gateway machines receives the RIB for its local SR from the network controller, and converts this into a forwarding information base (FIB), which it uses to install the routing table on the VM to implement the SR. In some such embodiments, the BGP control plane operating on the VM 335 sends an updated RIB to each of these local controllers when updates are received from the routers 125 and 130. The local controllers then calculate an updated FIB and configure the routing table of their respective SR VM with the updated routing table.

In the example shown in FIGS. 1-3, the logical router that connects to the external network also connects directly to the logical switches. In some embodiments, two tiers of logical routers are defined within a logical network. Provider logical routers (PLRs) provide a connection between the logical network implemented in a datacenter and the external network, and are often administered by the owner of the datacenter. Multiple tenant logical routers (TLRs) may connect to the southbound interfaces of PLRs, allowing different tenants of a datacenter to configure their own logical routers (and logical switches). In the two-tiered case of some embodiments, the PLRs implement BGP (or other routing protocols) in the manner described herein, in order to exchange routes with the external network. In some such cases, the logical switches that connect to the TLRs may be public subnets, and the PLR advertises routes for these logical switch subnets. The two tiers of logical routers are described in further detail in U.S. Provisional Application 62/110,061 and U.S. patent application Ser. No. 14/814,473, which are incorporated by reference above.

II. Operation of SR in Route Server Mode

As indicated above, in some embodiments a network controller selects multiple gateway host machines for the multiple SRs of a logical router that interfaces with an external network. In addition, some embodiments select one of these gateway host machines to serve as a master routing protocol control plane for all of the SRs. Other embodiments use an entity external to the gateway host machines (e.g., a central controller) to act as the master routing protocol control plane for all of the SRs. Each of these SRs appears to the external network as a separate interface (e.g., a separate line card), advertising routes to the external network and receiving dynamic routing protocol information from the external network. However, rather than processing the routing protocol data themselves, all of the SRs forward the data to the master control plane, which identifies any updates based on the data, and updates the SR routing tables.

A. SR Configuration

Figure 4:
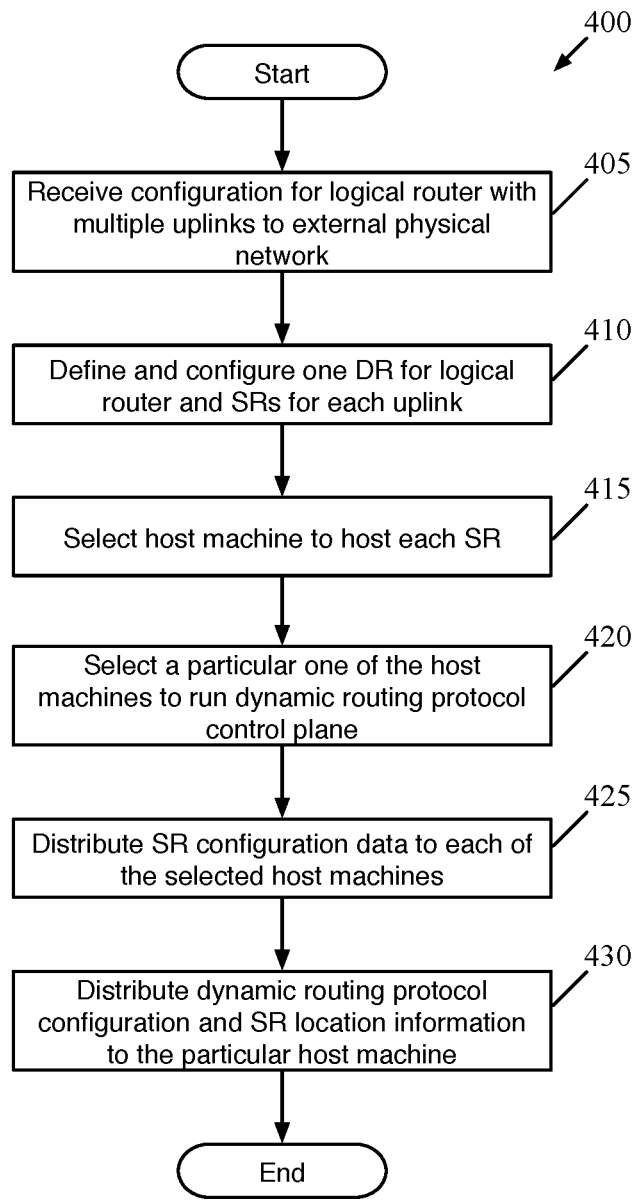
FIG. 4 conceptually illustrates a process of some embodiments for configuring SRs to implement the uplinks of a logical router, with one of the SRs assigned to operate a control plane for a dynamic routing protocol.

FIG. 4 conceptually illustrates a process 400 of some embodiments for configuring SRs to implement the uplinks of a logical router, with one of the SRs assigned to operate a control plane for a dynamic routing protocol (e.g., BGP). In some embodiments, the process 400 is performed by a network controller that manages the logical router. That is, in some embodiments, a network control system for managing a network in a datacenter may include numerous network controllers, with different controllers assigned to manage different logical networks or different logical forwarding elements. In this case, the network controller that manages a particular logical router will generate the configuration data for the logical routing constructs (DR, SRs, transit logical switch) of the particular logical router and distribute the configuration data to the host machines that implement the logical router. In some embodiments, the network controller distributes the configuration data to local controllers operating on the host machines, that translate the configuration data into a format used to configure the local software switches or VM routing tables.

As shown, the process 400 begins by receiving (at 405) a configuration for a logical router with multiple uplinks connecting to an external physical network. In some embodiments, a network administrator defines the logical router through a management application user interface, which in turn generates API commands to the network controller based on the user configuration. Thus, the network controller receives the logical router configuration as one or more API commands (e.g., to create a logical router, create interfaces, create static routes, etc.). In some embodiments, the logical router may have 0 or more uplinks (e.g., with a maximum of 8, 16, etc. uplinks). A logical router with 0 uplinks will not communicate with either the external network or other logical routers; in this case, the router would serve primarily as a means for several logical switches or other logical routers to communicate with each other.

Some embodiments require that the uplinks all have the same L3 connectivity, while other embodiments allow different L3 connectivity for different uplinks. However, if different uplinks connect to different external routers, then not only will the different SRs receive different routing protocol information, but a single control plane would need to create different routing table updates for the different SRs, and the computation benefits of having only the single control plane will be diminished. That is, the single routing protocol control plane would perform one set of updates for a first SR based on routing protocol data received from the routers to which the first SR connects, then a second set of updates for a second SR based on routing protocol data received from the routers to which the second SR connects, and so on. However, when multiple uplinks share the same L3 connectivity, then some embodiments will aggregate the routing protocol control plane for these SRs, even if other uplinks of the logical router have different L3 connectivity and run a separate control plane.

After receiving the configuration, the process 400 defines and configures (at 410) a DR for the logical router and one SR for each uplink of the logical router. Though not discussed here in detail, some embodiments allow multiple uplinks to be assigned to the same SR. In the case that all the uplinks have the same configuration (e.g., there are no stateful services defined on any of the uplinks) and the same L3 connectivity, then assigning two uplinks to the same SR would just result in that SR receiving twice as much traffic as the other SRs, with no benefit. The definition and configuration of the DR and SRs, including routing table configuration, is described in further detail in U.S. Provisional Patent Application 62/110,061 as well as U.S. patent application Ser. Nos. 14/814,473 and 14/871,968, all of which are incorporated by reference above.

The process also selects (at 415) a host machine to host each SR. In some embodiments, the datacenter includes sets of host machines (e.g., clusters) that are specifically allocated as gateway host machines, for hosting SRs. Some embodiments allow numerous SRs (for different logical routers) to be hosted on each gateway host machine, while other embodiments allow only one (or a small number) of SRs per gateway host machine. In some embodiments, the network controllers load balance the SRs for numerous logical routers across the gateway host machines in a cluster. However, when only a single PLR is defined for a datacenter, then only one SR will be assigned to each gateway host machine, assuming the SRs for a specific logical router are all assigned to different host machines.

After selecting the set of host machines for the SRs, the process 400 selects (at 420) one of the host machines (i.e., one of the host machines selected to host an SR) to run a dynamic routing protocol control plane for the logical routers. In some embodiments, this choice is random, or designed to approximate a random distribution (e.g., by calculating a hash value of a set of configuration inputs and using the hash value to assign the routing protocol control plane to one of the host machines). Other embodiments use the locations of the host machines relative to each other, assigning the routing protocol control plane to the host machine with the shortest distance to all of the other host machines in the set selected for the SRs. As mentioned, some embodiments use a controller (e.g., the controller performing the process 400) to run the dynamic routing protocol control plane instead of one of the host machines of an SR.

Having selected host machines and generated the required configuration data, the process then distributes (at 425) the SR configuration data for the various SRs to each of the selected host machines and (at 430) the dynamic routing protocol configuration and SR location information to the particular host machine selected to operate the dynamic routing protocol control plane. As indicated above, some embodiments distribute the SR configuration data for a particular SR to a local controller operating on the host machine to which the SR is assigned. This local controller is responsible for configuring the SR on the host machine, which may include calculating a routing table for the SR to use based on a received RIB. The local controller also configures the MFE on the host machine in some embodiments to implement the DR of the logical router (based on configuration data received from the centralized network controller), as well as any other logical forwarding elements in the network (e.g., other logical routers, logical switches, etc.).

In some embodiments, the dynamic routing protocol configuration that is distributed to the selected host machine includes the routing information base for the SRs. If L3 connectivity is the same for all of the SRs, then the SRs should all have the same RIB, unless the administrator configured certain static routes to output via a particular one of the uplinks. The south-facing routes all have the northbound interface of the DR as their next hop address, and the north-facing routes should also be the same in the different SRs. As such, in these situations, the network controller distributes one RIB for configuration of the dynamic routing protocol control plane, as well as information indicating the locations of the other SRs to which RIB updates will be distributed.

In addition, the network controller distributes configuration data that indicates to the local controller on the particular host machine that it will be hosting the routing protocol control plane. As mentioned, in some embodiments the SRs are implemented as VMs, with the routing protocol operating within the same VM. In other embodiments, a second VM is instantiated on the host machine to perform the routing protocol operations. Other embodiments implement the SR in other form factors besides a VM (e.g., as a VRF directly in the datapath of the MFE, as a namespace or other non-VM data compute node, etc.). The control plane may operate as a separate VM or other data compute node in some of these embodiments.

B. Routing Protocol Operation

Figure 5:
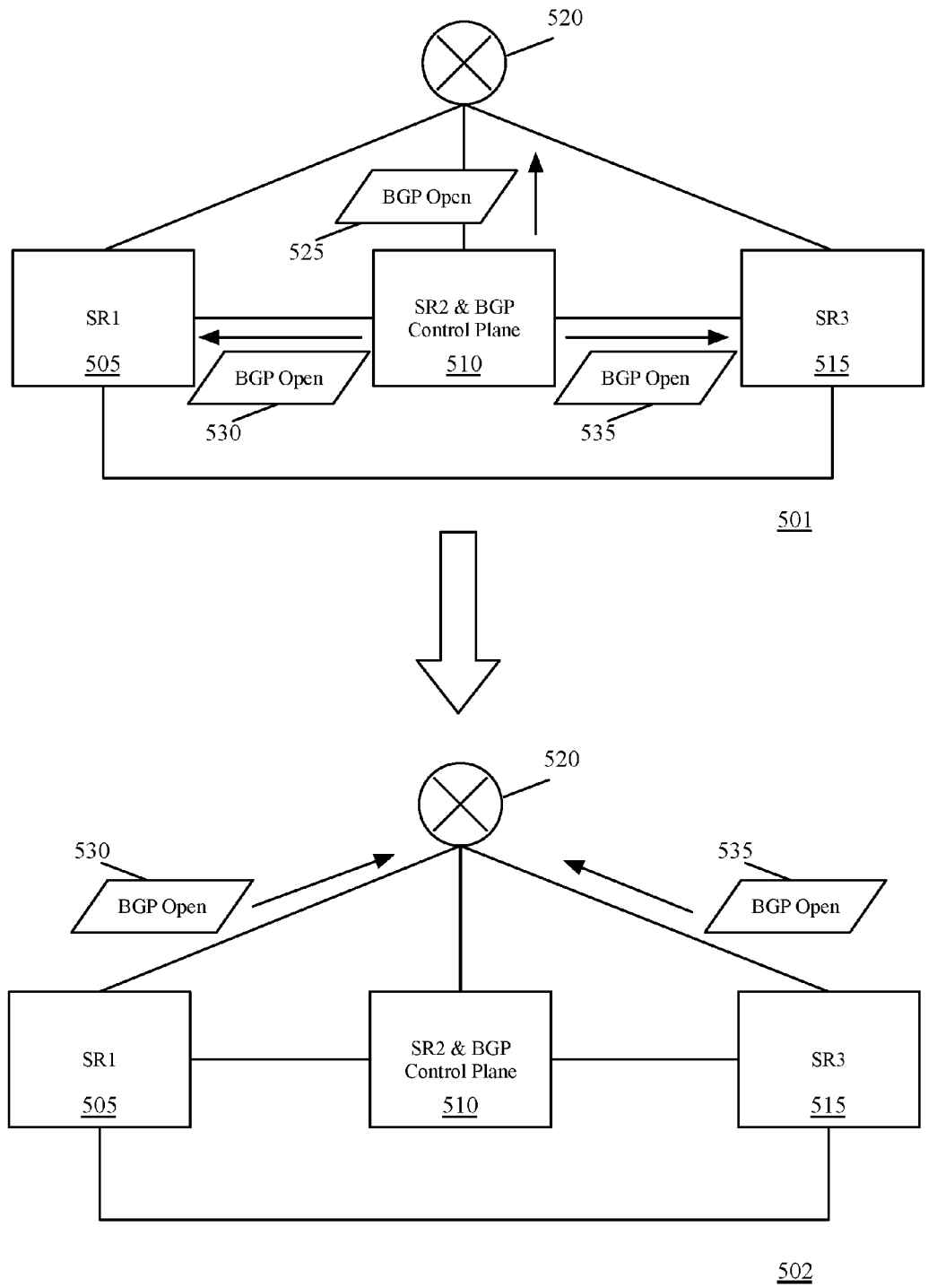
FIG. 5 illustrates the start of BGP operations and establishment of adjacency with an external router.

Once the SRs are configured, the logical router (and the rest of the logical network) may begin operations. FIG. 5 conceptually illustrates a portion of a network 500 that will be used throughout this section as an example. Specifically, FIG. 5 illustrates the start of BGP operations and establishment of adjacency with an external router over two stages 501-502. In this case, the network 500 includes three SRs 505-515 of a logical router. These three SRs 505-515 operate on separate host machines (e.g., as VMs) in a datacenter. For simplicity, the host machines are not shown, nor are the MFEs that operate on the host machines in some embodiments. The BGP control plane operates on the SR 510 in this example, based on selection by the network controller that manages the logical router to which these SRs belong.

The SRs 505-515 include connections to each other as well as to a physical router 520 that provides a connection to the network external to the datacenter (e.g. to the Internet). As described above, the connections between the SRs, in some embodiments, are actually tunnels between the MFEs that operate on the respective host machines of the SRs. Similarly, the connections between the SRs and the external router also pass through the MFEs on host machines of the SRs as well (with the MFE handling the packet delivery to and receipt from the NIC) on these host machines.

To begin operation and establish adjacency with the external routers, in some embodiments the SR on which the BGP control plan operates initiates routing protocol sessions with each external router to which the SRs connect. In the first stage 501 of this example, the SR 510 sends a BGP Open message 525 to the external router 520, with its own IP address in the message. In addition, the SR 510 generates BGP Open messages 530 and 535 for the SRs 505 and 515, to be sent to the router. However, these messages are tunneled to the respective SRs at this stage (the encapsulation is not shown in the figure). In the second stage 502, the SRs 505 and 515 decapsulate the BGP Open messages 530 and 535, respectively, and forward these onto the external router 520. Once the SRs detect that these are BGP packets, they skip any further processing and forward them on to the peer router, such that they effectively act simply as interfaces for the single router operating at the SR 510 with the control plane.

This process assumes that the BGP control plane has negotiated a successful TCP connection with the external router 520, and thus is in the Connect state of the standard BGP state machine. After sending the BGP Open messages, then the BGP state machine transitions to the OpenSent state. In some embodiments, the BGP control plane manages a separate BGP state machine for each SR, while in other embodiments the BGP control plane manages a single state machine for its adjacency with the external router. Assuming no errors, the SRs 505 and 515 would each receive an Open message in return, which they would forward via tunnel to the SR 510 (which should also receive such a message). The BGP control plane at SR 510 would then send Keepalive messages to the external router 520 through each SR (transitioning to the OpenConfirm state), and listen for Keepalive messages from the external router (at which point it would transition to the Established state, so that routes can be exchanged between the peers).

The route exchange from the SRs to the external router happens as is normal for BGP. That is, the SRs send Update messages (or forward messages generated by the control plane) indicating the reachable subnets, which are those that the user(s) of the logical network have opted to make public (and for which public IP addresses have been assigned). These messages indicate the sending SR uplink as the next hop IP address, and have a low administrative distance (assuming the logical network is all within a single autonomous system), as they only include routes for the logical network subnets. Even if a SR connects to multiple routers, in some embodiments the SR will not advertise routes learned from one router to another router, so as to avoid having to process traffic not sent to or from the logical network. As such, the BGP updates sent through the SRs should only change when new public subnets are added to the logical network.

Figure 6:
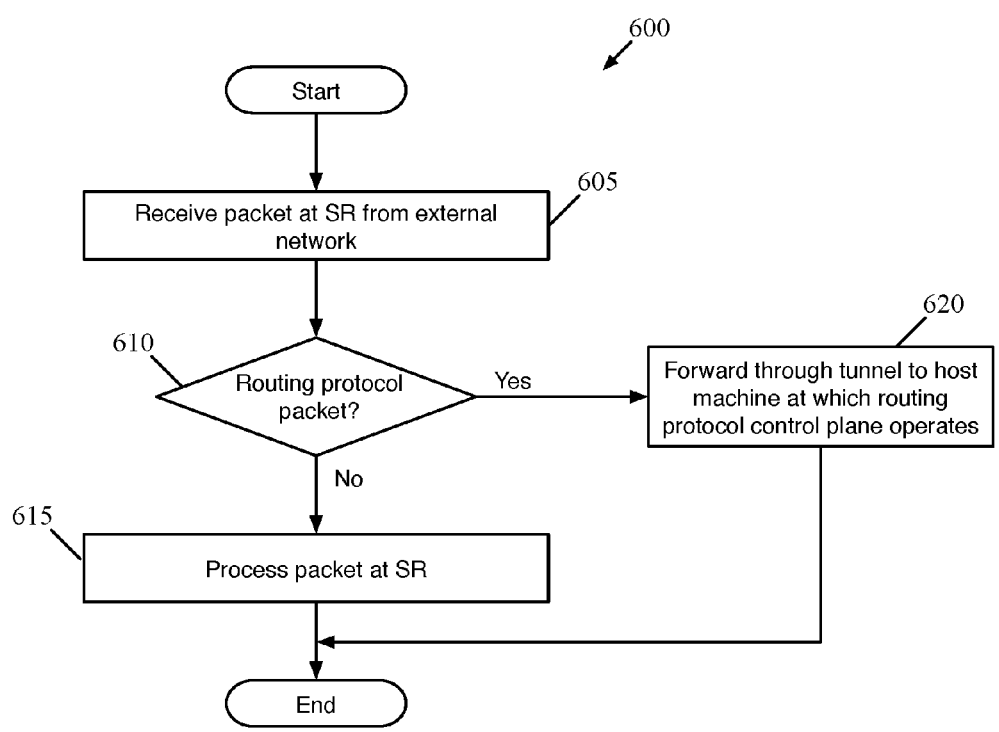
FIG. 6 conceptually illustrates a process of some embodiments performed by a SR, that does not host the routing protocol control plane, upon receipt of a packet.

However, BGP updates may be received regularly from the external routers, as the external network will generally be more subject to changes that affect the routes advertised. FIG. 6 conceptually illustrates a process 600 of some embodiments performed by a SR that does not host the routing protocol control plane upon receipt of a packet. While this process 600 is performed by the SR, in some embodiments a similar process that discriminates between data packets for processing by the SR and routing protocol packets may be performed by the MFE operating the host machine with the SR. For example, if the MFE is a flow-based virtual switch (e.g., Open vSwitch), some embodiments include flow entries that match on the fields that indicate that the packet is a BGP (or other routing protocol) update packet, and automatically forward those packets through a tunnel to the correct host machine. In other embodiments, the MFE forwards the packet to the SR based on its destination address, and the SR identifies that the packet is an update and sends the packet to the correct host machine (via the MFE).

As shown, the process 600 receives (at 605) a packet at the SR from the external network. This packet could be a data packet intended for a particular user VM (or a public IP address that corresponds to multiple user VMs). For instance, if a datacenter tenant operates a web server in the datacenter, this web server would likely send and receive large amounts of traffic with clients in the external network. Incoming traffic would pass through the SR for routing in this case. In addition, external routers with which the BGP control plane has established adjacency through the SR will also send BGP packets (e.g., Open messages, Keepalive messages, updates, etc.) to the SR.

The process determines (at 610) whether the received packet is a routing protocol packet. In some embodiments, prior to performing any additional processing, the SR performs a check to determine whether the packet is a routing protocol packet that should be passed along to the SR that runs the control plane for the routing protocol. BGP packets (or packets for other routing protocols) will (i) have a destination address of the SR itself, rather than a workload in the logical network (e.g., a user VM) and (ii) identify the routing protocol in its headers. Thus, Update, Open, Keepalive, etc. messages will be received by the SR (when the routing protocol is BGP), and should be forwarded to the control plane (as they relate to the establishment and maintenance of the peering).

Thus, when the received packet is not a routing protocol packet, the process 600 processes (at 615) the packet at the SR. If the packet is a packet for another routing protocol maintained at the SR, the SR performs the actions required based on such a packet. The packet could also be a standard data packet (e.g., a TCP segment, UDP datagram, etc.), in which case the SR routes the packet according to its FIB and performs any other required processing.

On the other hand, when the packet is a routing protocol packet, the process forwards (at 620) the packet through a tunnel to the host machine at which the routing protocol control plane operates. That is, once the SR identifies that the packet is a BGP packet (by looking at its header), the SR encapsulates and forwards the packet without any further processing. In some embodiments, the SR is configured to modify the destination IP and/or MAC address of the packet to be that of the SR with the control plane. The SR then sends the packet back to its local MFE, which tunnels the packet to the MFE at the remote host machine where the routing protocol control plane resides. The process then ends.

Figure 7:
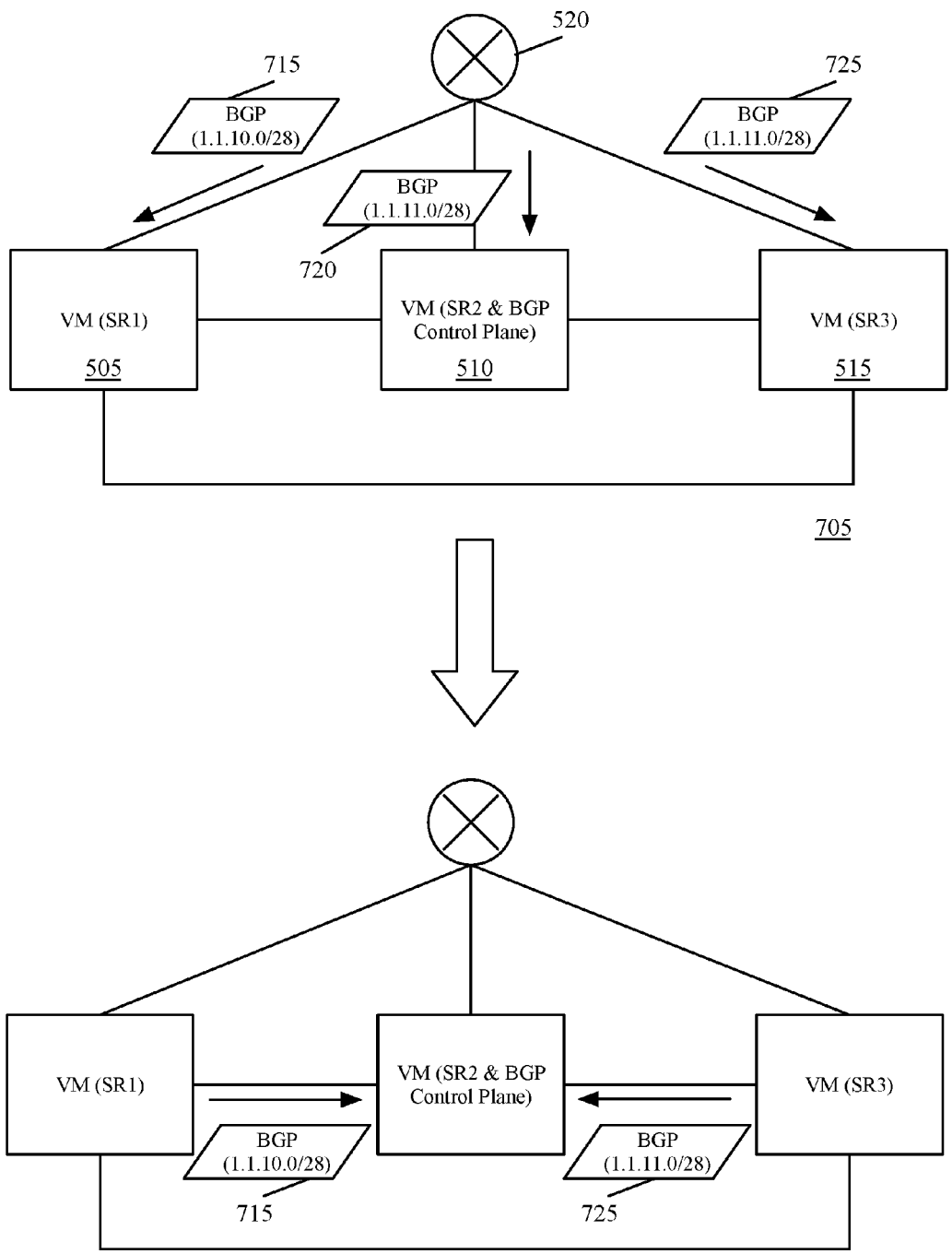
FIG. 7 illustrates the receipt of BGP updates by the three SRs of FIG. 5.

FIG. 7 illustrates the receipt of BGP updates by the three SRs 505-515 over two stages 705 and 710. In the first stage 705, the external physical router 520 sends BGP updates to the three SRs 505-515. The first SR 505 receives an update 715 with information about a route for the prefix 1.1.10.0/28, while the second and third SRs 510 and 515 receive updates 720 and 725 respectively, which both provide the same information about the prefix 1.1.11.0/28. As with any standard BGP update, these provide information about the reachability of the indicated IP prefixes, noting the number of hops (or number of autonomous systems) needed to reach the IP address through the router that sends the update message (i.e., the router 520).

As shown in the second stage 710, the first SR 505 and third SR 515 send their updates packets 715 and 725 to the second SR 510 that operates the BGP control plane for the three SRs. That is, because these SRs do not process dynamic routing updates to the routing table themselves, they do not do anything with the packets 715 and 725 beyond forwarding them to the SR 510. The SR 510 does not have to forward the packet 720 that it receives from the external router 520, as it will process the packet internally (along with the other updates that it receives from the other SRs).

Figure 8:
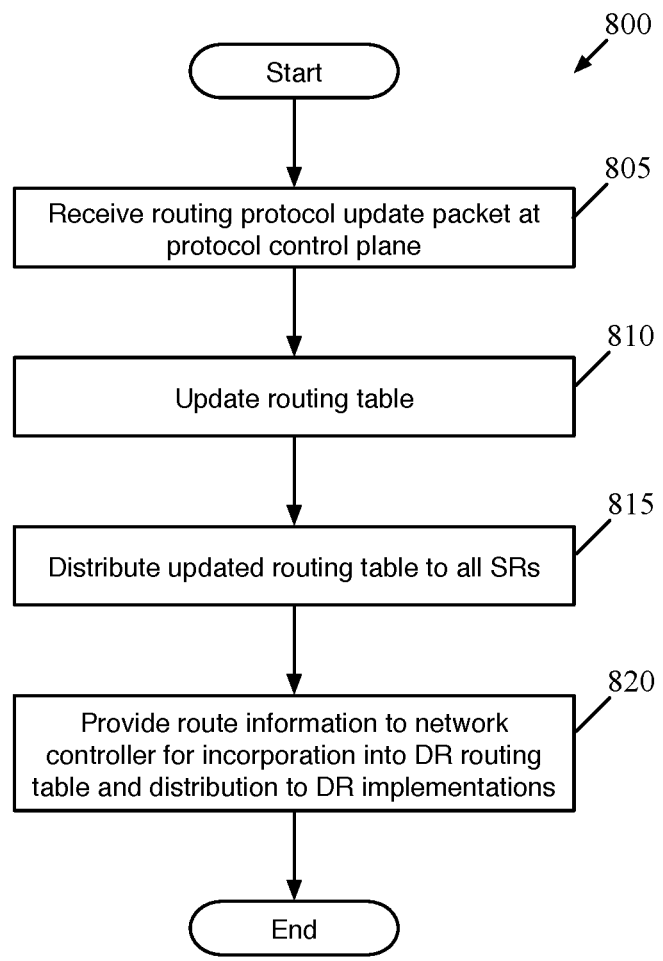
FIG. 8 conceptually illustrates a process of some embodiments performed by the dynamic routing protocol control plane operating as a route server to update routing tables for all of the SRs of the logical router.

FIG. 8 conceptually illustrates a process 800 of some embodiments performed by the dynamic routing protocol control plane operating as a route server to update routing tables for all of the SRs of a logical router. This process may be performed at one of the SRs of the logical router (e.g., the SR 510 in the above example) in some embodiments, or at a central controller that manages the SRs in other embodiments. When the routing protocol control plane operates within the SR, this process is performed by the SR itself. However, the process could also be performed by a separate VM that operates on the same host machine as the SR to perform the routing protocol control plane operations in some embodiments. Furthermore, in other embodiments, the local network controller on the host machine performs the routing protocol control plane operations.

As shown, the process 800 begins by receiving (at 805) a routing protocol update packet at the protocol control plane. This could be a packet received directly from an external router (e.g., the packet 720) or a packet received by a different SR and forwarded to the SR that runs the routing protocol control plane. For the BGP protocol, the update packets indicate a routable prefix (or prefixes) for which data traffic can be sent to the router from which the packet was received, the autonomous system number of the sending router, and the reachability distance for each routable prefix.

Based on the received update packet, the process updates (at 810) its routing table. As described above by reference to FIG. 4, in some embodiments the routing protocol control plane is configured with an initial routing table (i.e., RIB) for the SRs generated by the centralized network controller. As the routing protocol control plane learns routes from external routers, it updates this routing table.

When a new route is received, the control plane of some embodiments determines whether the routing table already has a route with the same prefix and next hop (i.e., whether it has already received an advertisement for the same prefix from the same external router). When this is the case, the control plane updates this route entry to reflect the new data (e.g., a different administrative distance). If the control plane routing table has a route for the same prefix but with a different next hop, then in some embodiments it stores both of the routes (as the routes might both be used if the administrative distance is the same). However, some embodiments also identify an optimal path for the route by choosing the route with the lowest cost (e.g., lowest administrative distance). Thus, when the SRs connect to multiple external routers, the computation savings of maintaining the one control plane to compare routes for the same prefix is increased. By performing all of the updates at the single routing protocol control plane, the duplicative updates need not be processed separately.

The process then distributes (at 815) the updated routing configuration (i.e., the routing table updates) to all of the SRs. This includes the SR that is local to the control plane performing the process 800, any remote SRs that sent updates to the control plane, and any other remote SRs for the logical router. In some embodiments, the routing protocol control plane provides the updated routing table to the local network controllers at all of the gateway host machines that host the SRs, which allows these to calculate updated FIBs with which to provision their respective local SRs. In other embodiments, the SR itself (e.g., the VM) performs the route traversal process to generate the FIB based on the updated RIB. In still other embodiments, the routing protocol control plane actually performs the route traversal process to generate an updated FIB, and this is what is then distributed to each of the SRs.

In addition to distributing the updated routing configuration to the SRs, the process 800 also provides (at 820) the updated route information to the centralized network controller for incorporation into the routing table of the DR of the logical router, and subsequent distribution to the MFEs that implement the DR (including the MFEs on the gateway host machines at which the SRs reside). Some embodiments use the local controller on the gateway host machine that runs the routing protocol control plane to pass this information up to the network controller that manages the logical router, which incorporates the route updates into the RIB for the DR. This information is then sent to the local controllers at the various host machines that implement the logical network (e.g., the machines 305 in FIG. 3), which configure the MFEs that implement the DR (e.g., the MFEs 310). In addition, the centralized controller sends the information regarding the DR routing table to the local controllers at the host machines with the SR, which configure the MFEs there that also implement the DR.

Figure 9:
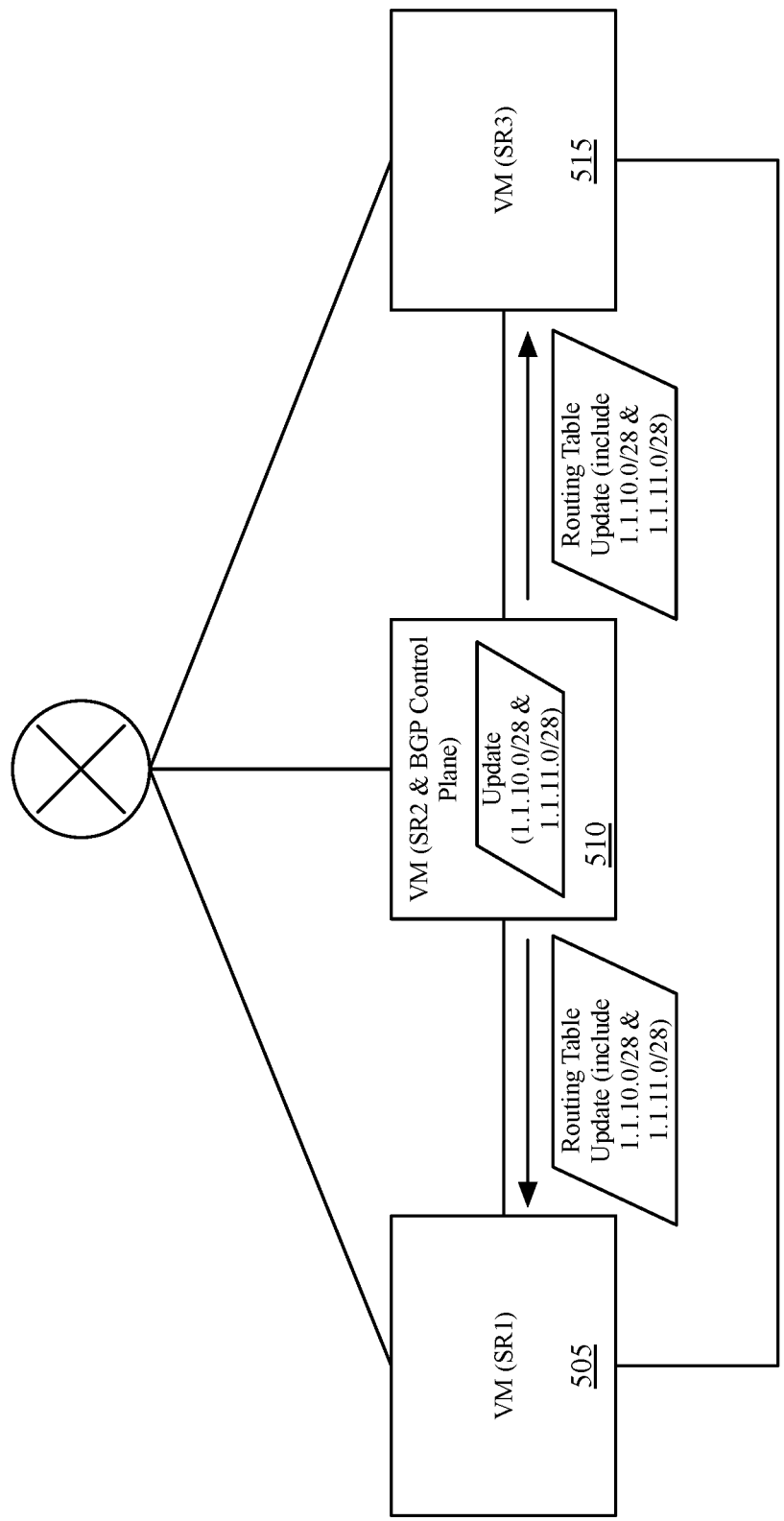
FIG. 9 illustrates the data distributed by the routing protocol control plane operating on one SR to the other SRs, based on received updates.

FIG. 9 illustrates the data distributed by the routing protocol control plane operating on the SR 510 to the other SRs 505 and 515, based on the updates received in FIG. 7. Specifically, as shown in FIG. 7, the routing protocol control plane received updates regarding the prefixes 1.1.10.0/28 and 1.1.11.0/28. The BGP control plane then determines whether these updates reflect new information, and if so performs the computations to update its routing table. For example, in this case the control plane discards the duplicative updates for the route 1.1.11.0/28, and adds new routes for the two prefixes. The BGP control plane then distributes these updates to the SRs 505-515. Specifically, in some embodiments the BGP control plane distributes these updates to the local controllers (not shown) operating on the host machines on which these SRs reside. These local network controllers then recalculate the FIB for their respective SRs, and configure their SRs with the new routing configuration.

Figure 10:
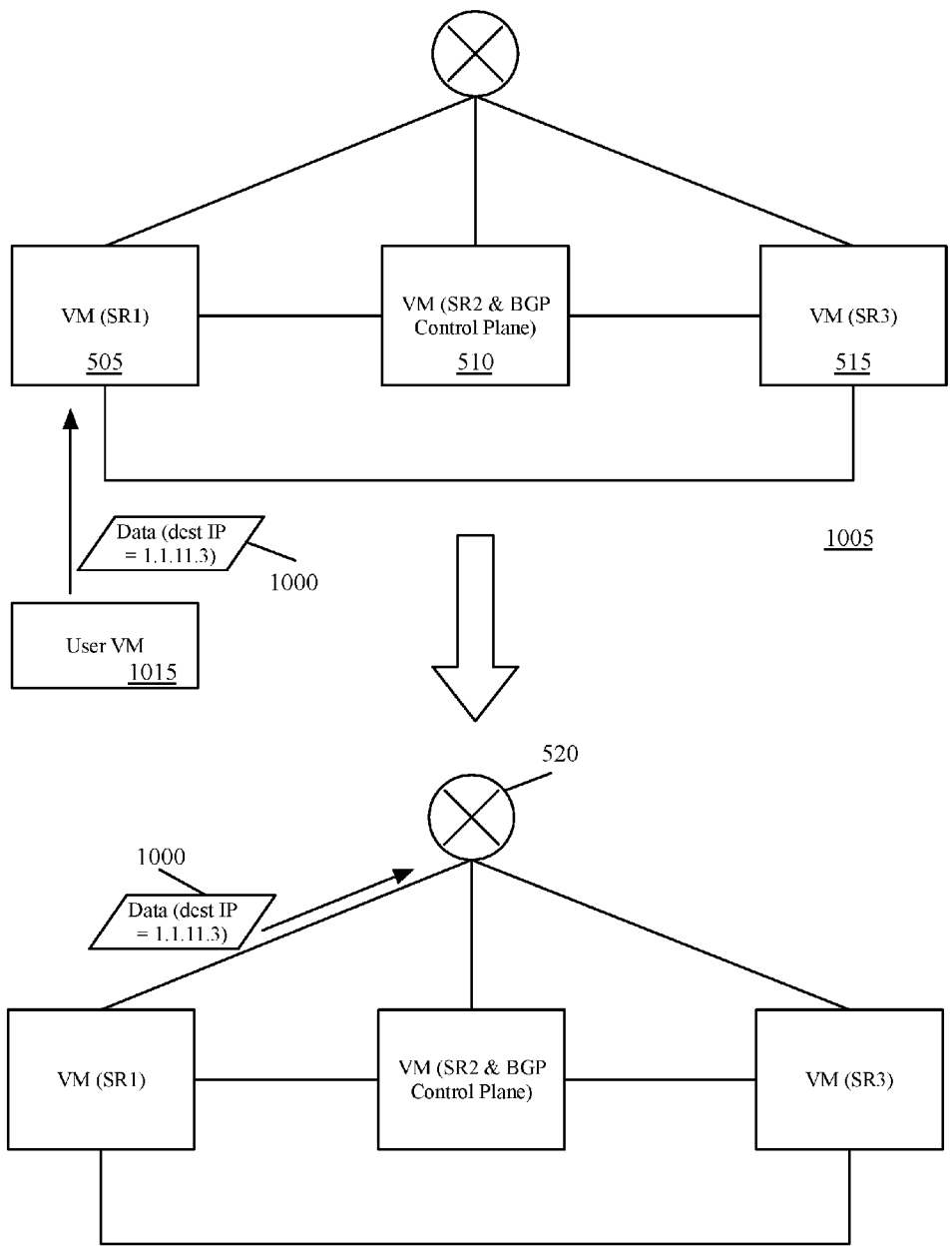
FIG. 10 illustrates the processing of a packet by an SR using newly distributed routing information.

FIG. 10 illustrates the processing of a packet 1000 by one of the SRs 505-515 using the newly distributed routing information, over two stages 1005 and 1010. As shown, in the first stage 1005 the SR 505 receives a packet sent by a user VM 1015 (e.g., a VM logically attached to a logical switch that in turn attaches to the logical router to which the SRs 505-515 belong). In order for the SR 505 to receive the packet 1000, in some embodiments, the user VM sends the packet to its local MFE, which performs first-hop processing on the packet. This first-hop processing at the MFE process the packet through pipelines for the logical switch to which the VM connects, then the DR, and then the transit logical switch. The transit logical switch identifies the southbound SR interface as the destination for the packet, and thus identifies to tunnel the packet to the host machine on which the SR 505 resides. The MFE local to the SR 505 then completes the transit logical switch processing to deliver the packet to the SR. The data processing pipelines of some embodiments are described in greater detail in U.S. Provisional Application 62/110,061 and U.S. patent application Ser. No. 14/814,473, which are incorporated by reference above.

Once the SR 505 receives the packet 1000, it routes the packet according to its routing table. In this case, the routing table now has a route indicating that packets with destination IPs in the range 1.1.11.0/28 should be sent to the external router 520. As such, in the second stage 1010, the SR sends the packet (through its local MFE again, in some embodiments) out of the physical interface that corresponds to the uplink, to the external router. In this example, with only a single external router, the dynamic routing would most likely not be needed, as the logical router (and thus the SRs) would typically be configured with a default static route (i.e., for 0.0.0.0/0) to send all otherwise unrouted packets to the external router. However, when the SRs connect to multiple routers, then the default route for a particular SR might point to a first one of the routers, whereas the route for a specific subnet (such as 1.1.11.0/28) might point to a second router.

C. Failover of Control Plane

With the routing protocol control plane running on only one of several SRs of a logical router, but controlling the other SRs, failure of the control plane affects the other, still-operating SRs. In the case that each SR operates its own BGP (or other protocol) control plane, then failure of the BGP process on a particular SR simply means that the SR will not attract traffic from the external routers, and the other SRs will receive additional traffic. Similarly, the failure of the SR itself will result in the other SRs for the logical router taking over the ingress and egress traffic, as well as any policies configured on the uplink implemented by the failed SR. More detailed failure scenarios are described in U.S. Provisional Application 62/110,061 and U.S. patent application Ser. No. 14/814,473, which are incorporated by reference above.

When the SR that operates the control plane fails, some embodiments select one of the other SRs to operate the routing protocol control plane. As described above, the routing protocol process already runs on the other SRs in order to establish adjacencies with the external routers; however, these processes do not store the routing table to update based on incoming routes. Instead, as described in the previous sections, the routing table is only updated by the protocol control plane that operates on one of the SRs. Instead, the newly selected SR begins to update the control plane by using the graceful restart capability of most routing protocols. That is, all of the SRs re-establish their adjacencies as though they had crashed and restarted, which causes the external router to re-send all of their routes to the SRs, thereby enabling the new protocol control plane to quickly build up its routing table. In other embodiments, the backup SRs also run the routing protocol control plane, but use higher costs when sending out updates. This way, the external physical router will already have the routes for an adjacency with the other SR (or other SRs) as the master control plane, but will not use these routes due to the higher cost until the adjacency with the original master is lost.

Figure 11:
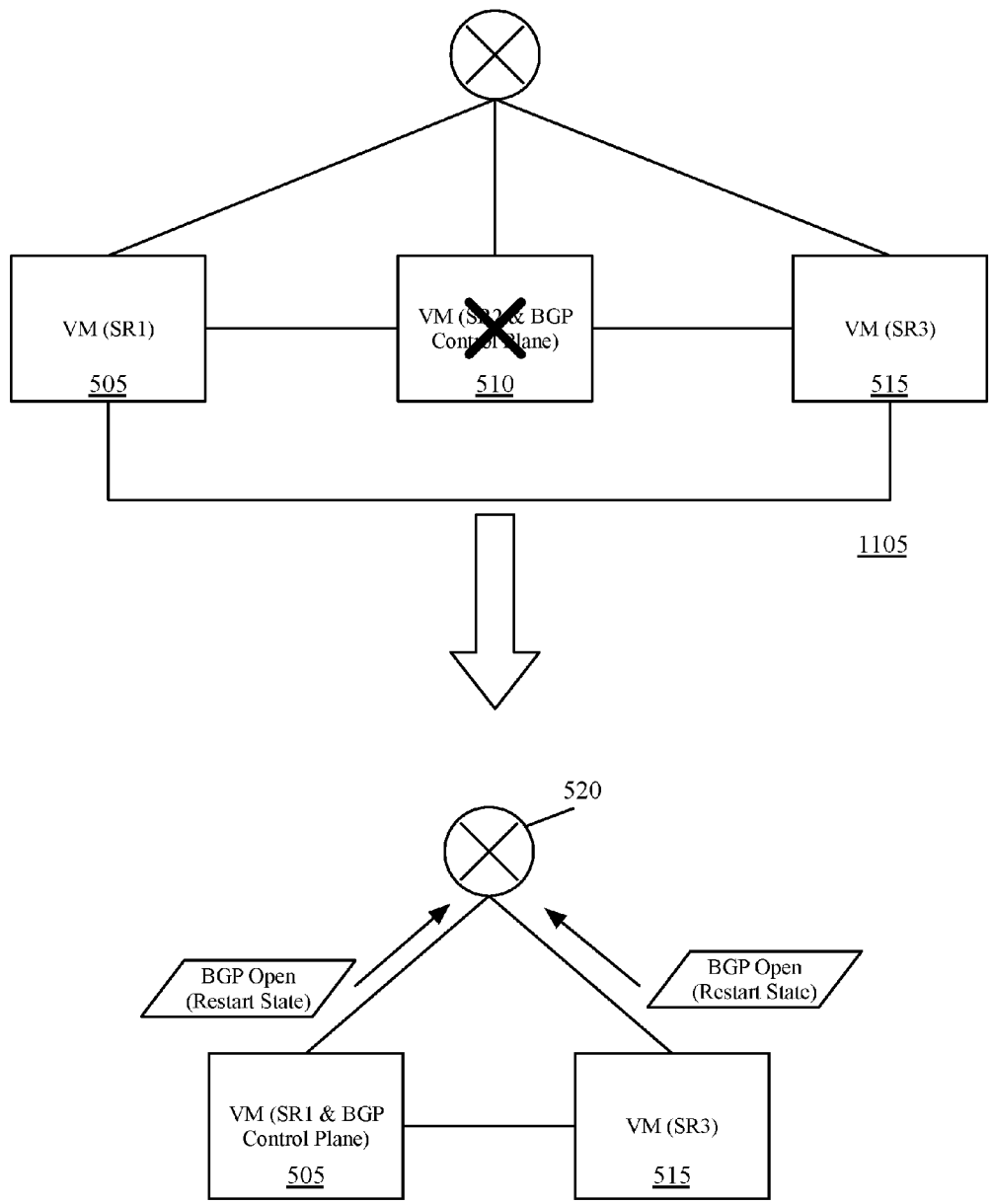
FIG. 11 illustrates the failover of a BGP control plane for a set of SRs.

FIG. 11 illustrates the failover of the BGP control plane for the SRs 505-515 over two stages 1105 and 1110. As shown in the first stage 1105, the SR 510 that operates the BGP control plane for the three SRs has failed. This may be due to the VM crashing, the entire gateway host crashing, one or more of the tunnels that connects the SR to the other SRs (or the user VMs) going down, the connection to the physical network going down, etc.

At this point, the other two SRs 505 and 515 identify that the second SR 510 has crashed, and that not only do they need to take over its interfaces, but also the BGP control plane. Some embodiments use a ranking system to identify which of the other SRs takes over for a failed SR. In some embodiments, each of the SRs is assigned a ranking at the time they are set up (e.g., by the management plane running in a centralized controller). The SR with the next highest ranking from the failed SR then takes over its interfaces, as well as the routing protocol control plane. In this case, the first SR 505 has the next highest ranking compared to that of the failed SR 510, and therefore takes over the BGP control plane.

Therefore, as shown at the second stage 1110, the VM for the first SR 505 now operates the BGP control plane for the two remaining SRs. In some embodiments, the local controller on the host machine where the SR 505 resides identifies the failure of the SR 510 and configures the control plane process to begin running on the VM. In addition, the local controllers on both of the host machines for the remaining SRs 505 and 515 initiate the restart process for their respective routing protocol processes. Thus, as shown, the two SRs 505 and 515 re-establish adjacency with the external router 520 by sending new BGP Open messages. These messages include a restart state bit that indicates this is a graceful restart. In some embodiments, this induces the router 520 to send its full list of routes to each of the SRs, allowing for the control plane operating at the first SR to update its routing table.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
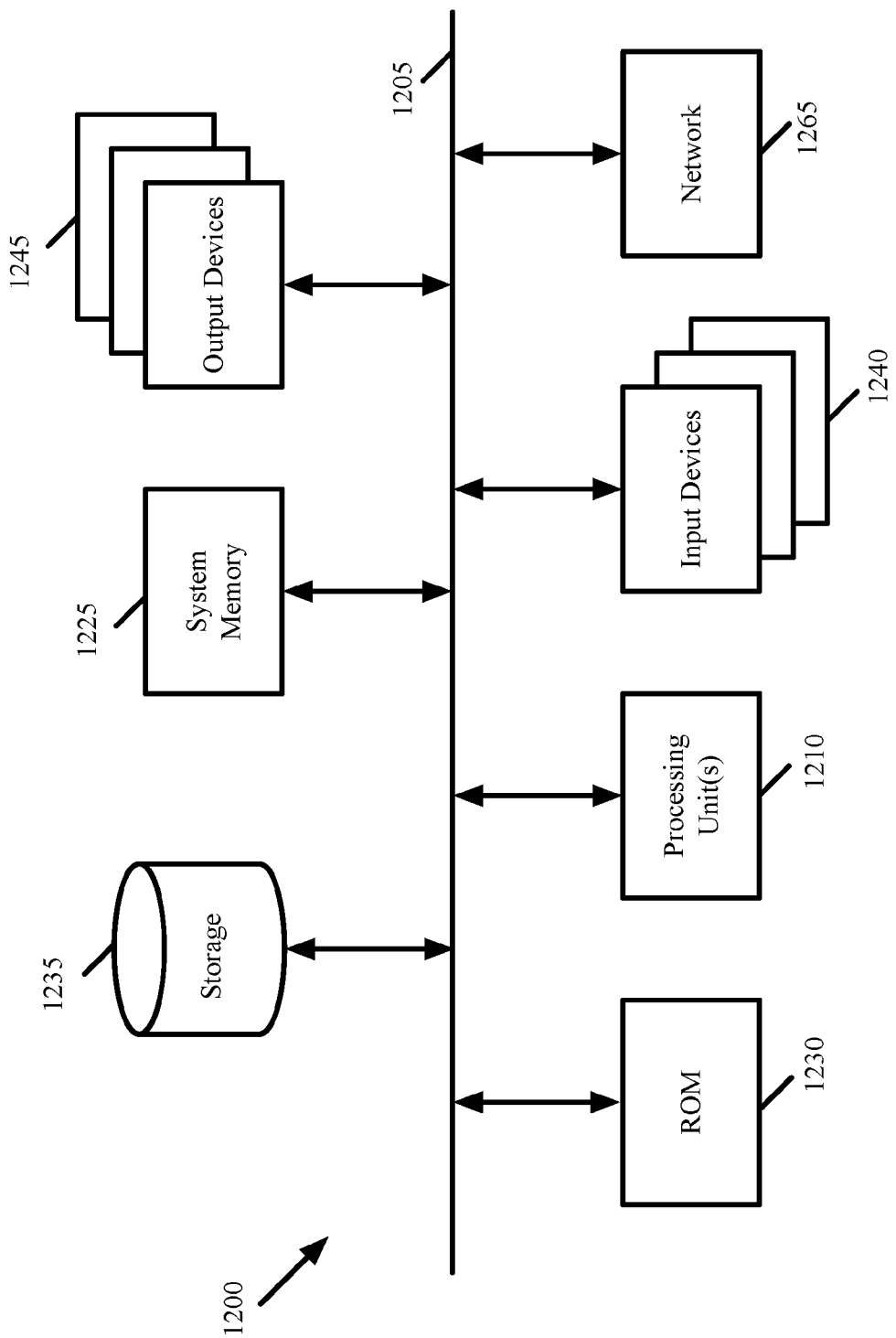
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4, 6, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a logical router that interfaces with an external network, the method comprising:
   receiving a configuration for a logical network comprising a logical router with a plurality of interfaces that connect to at least one physical router external to the logical network;
   selecting a separate host machine to host a centralized routing component for each of the interfaces; and
   selecting a particular one of the host machines for operating a dynamic routing protocol control plane that receives routing protocol data from each of the centralized routing components and updates routing tables of each of the centralized routing components.

2. The method of claim 1, wherein the configuration for the logical network comprises a set of logical switch subnets to advertise via the dynamic routing protocol to the at least one physical router.

3. The method of claim 1, wherein each of the interfaces connects to a same set of external physical routers.

4. The method of claim 1, wherein the plurality of separate host machines are located within a cluster of host machines designated for hosting centralized routing components of logical routers.

5. The method of claim 1 further comprising generating an initial routing table for each of the centralized routing components.

6. The method of claim 1, wherein the centralized routing components operate on the host machines as virtual machines.

7. The method of claim 6, wherein the dynamic routing protocol control plane operates on the virtual machine operating on the particular host machine.

8. The method of claim 6, wherein the dynamic routing protocol control plane operates on a second virtual machine operating on the particular host machine separate from the centralized routing component that operates on the particular host machine.

9. The method of claim 1, wherein when a centralized routing component operating on a first host machine that is not the particular host machine receives a routing protocol packet from an external physical router, the first centralized routing component forwards the packet to the particular host machine through a tunnel between the first host machine and the particular host machine.

10. The method of claim 1, wherein upon receiving a routing protocol packet from at least one of (i) an external physical router and (ii) a centralized routing component forwarding the routing protocol packet from an external physical router, the dynamic routing protocol control plane calculates updates to the routing tables of each of the centralized routing components and distributes the updates to the centralized routing components.

11. The method of claim 1, wherein the particular host machine is designated as an active machine for the dynamic routing protocol control plane, wherein each of the other host machines are designated as standby machines for the dynamic routing protocol control plane.

12. The method of claim 11, wherein if the particular host machine crashes, a designated one of the standby machines operates the dynamic routing protocol control plane as an active machine.

13. A machine readable medium storing a program which when executed by at least one processing unit configures a logical router that interfaces with an external network, the program comprising sets of instructions for:
   receiving a configuration for a logical network comprising a logical router with a plurality of interfaces that each connect to at least one physical router external to the logical network;
   for each interface of the logical router, selecting a separate host machine to host a centralized routing component that exchanges data traffic with the physical router; and
   selecting a particular one of the host machines to operate a dynamic routing protocol control plane that (i) receives routing protocol data from each of the centralized routing components based on interactions of the centralized routing components with the physical router and (ii) updates routing tables of each of the centralized routing components based on the routing protocol data.

14. The machine readable medium of claim 13, wherein the configuration for the logical network comprises a set of logical switch subnets to advertise via the dynamic routing protocol to the at least one physical router.

15. The machine readable medium of claim 13, wherein the program further comprises a set of instructions for generating an initial routing table for each of the centralized routing components.

16. The machine readable medium of claim 13, wherein the centralized routing components operate on the host machines as virtual machines.

17. The machine readable medium of claim 13, wherein when a centralized routing component operating on a first host machine that is not the particular host machine receives a routing protocol packet from an external physical router, the first centralized routing component forwards the packet to the particular host machine through a tunnel between the first host machine and the particular host machine.

18. The machine readable medium of claim 13, wherein upon receiving a routing protocol packet from at least one of (i) an external physical router and (ii) a centralized routing component forwarding the routing protocol packet from an external physical router, the dynamic routing protocol control plane calculates updates to the routing tables of each of the centralized routing components and distributes the updates to the centralized routing components.

19. The machine readable medium of claim 13, wherein the particular host machine is designated as an active machine for the dynamic routing protocol control plane, wherein each of the other host machines are designated as standby machines for the dynamic routing protocol control plane.

20. The machine readable medium of claim 19, wherein if the particular host machine crashes, a designated one of the standby machines operates the dynamic routing protocol control plane as an active machine.

* * * * *